May 1, 1951  I. JEPSON  2,551,563
COFFEE MAKER SEAL
Filed July 10, 1946  2 Sheets-Sheet 1
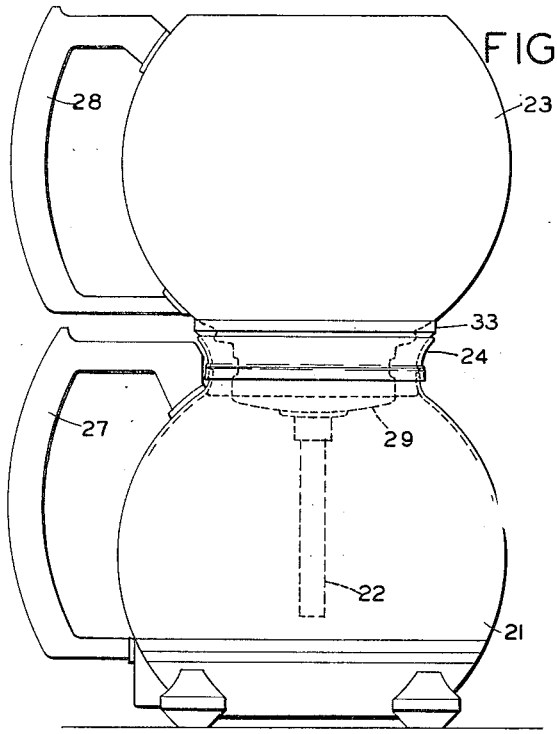
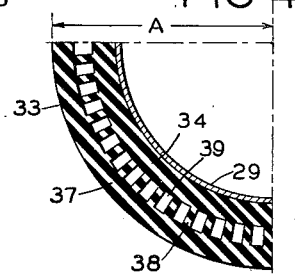
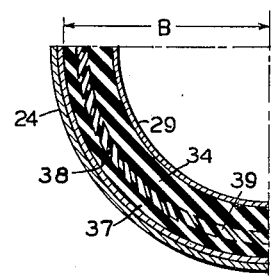
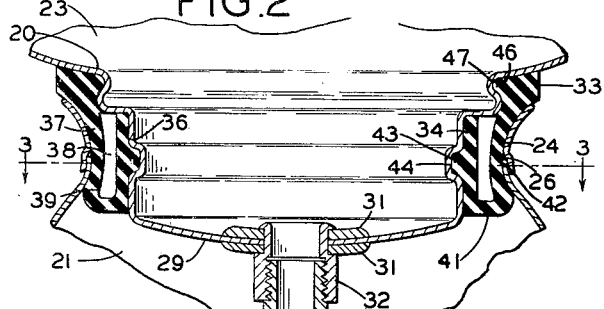
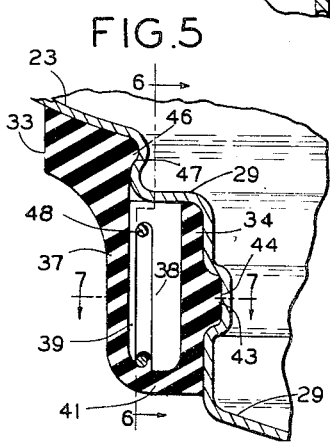
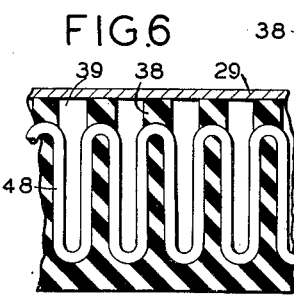
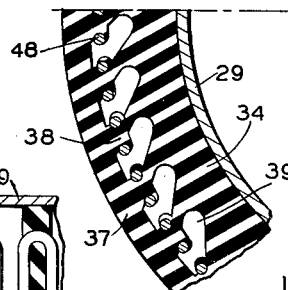
INVENTOR
BY Ivar Jepson
McCanna & Morsbach
ATTORNEYS May 1, 1951          I. JEPSON          2,551,563
COFFEE MAKER SEAL
Filed July 10, 1946          2 Sheets-Sheet 2
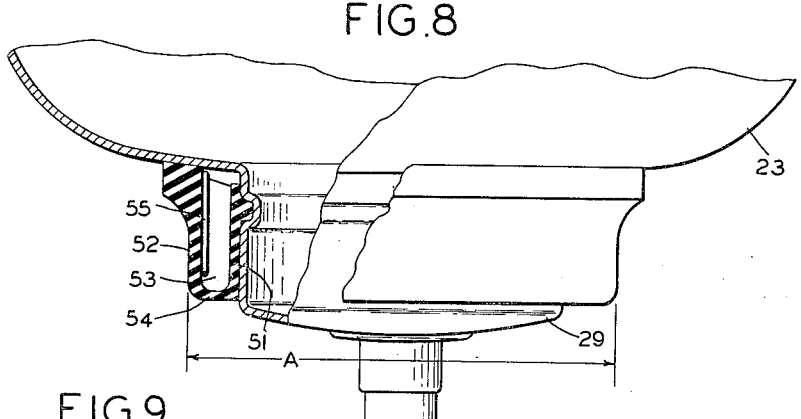
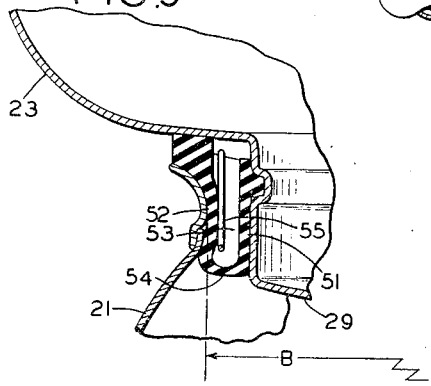
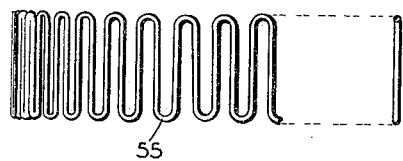
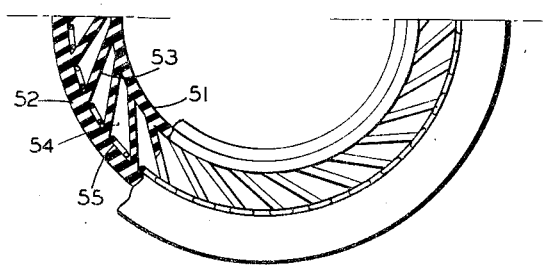
INVENTOR
Ivar Jepson
BY McGerns & Morsbach
ATTORNEYS Patented May 1, 1951

2,551,563

UNITED STATES PATENT OFFICE 2,551,563

COFFEE MAKER SEAL

Ivar Jepson, Oak Park, Ill., assignor to Sunbeam Corporation, Chicago, Ill., a corporation of Illinois Application July 10, 1946, Serial No. 682,710

6 Claims. (Cl. 288—11)

This invention relates to improvements in the kind of coffee maker commonly known as the vacuum type in which water is heated in a lower container and transferred to an upper container for contact with the ground coffee, whereupon it is returned to the first container. This invention has special reference to an improved gasketed connection between the upper and lower containers.

In coffee makers of this kind a gasket of rubber-like material is usually mounted on a depending portion of the upper container and is frictionally engageable with the throat or opening of the lower container. One or both of these containers is made of glass or metal and, inasmuch as they are not made with extreme precision, the diameter and circularity of the throat in the lower container will vary somewhat. This varition is not objectionable but it must be taken into account by providing the engaging gasket surface of sufficient oversize dimension to fit with proper snugness in even the widest throats. The throat opening must be sufficiently large to allow passage of the hand for cleaning the interior of the container. I have found from actual experience in testing many hundreds of these coffee makers that with a normal throat diameter of approximately 3¼", for example, the diameter of that part of the gasket engaging the throat should be approximately ⅛" larger to compensate for the variation in throat and gasket sizes, etc.

Also, it has been the practice to clamp the upper and lower containers, one to the other, and thereby maintain the gasket under compression. Such clamping means usually involves parts extraneous to the containers, although coacting therewith; and in view of the additional cost of such clamping means and necessary manual operations involved, they are not altogether satisfactory.

I have found, therefore, that one of the problems is to provide a gasket construction which will satisfactorily maintain an effective and safe seal between the containers against the pressure incident to vacuum type coffee making and which will permit of easy assembling and disassembling of the containers.

I have tried many types of solid rubber gaskets for this service but none have been satisfactory. When made of solid rubber of sufficient strength and surface hardness to withstand the heat, friction, and other service conditions, the gasket is so uncompressible that it is difficult to press the containers together. Conversely, when made of solid rubber soft enough that the vessels are readily pressed together, the gasket does not possess the required strength or frictional characteristics. I have found that by making the gasket hollow or with cavities in a special way, it is possible to use a rubber having the optimum surface hardness and elastic properties and still obtain a gasket of high radial compressibility and long life for the desired sealing functions.

Accordingly, it is a principal object of my invention to provide a gasket for use in coffee makers of the double container vacuum type which has the optimum surface hardness to avoid sticking and which has a high degree of radial compressibility, whereby to provide an effective fluid seal under all conditions and one which will permit ease of assembly and disassembly. In a preferred embodiment my invention provides an improved gasket which is formed of rubber-like material having a series of cavities circumferentially arranged preferably in alternate succession with connecting walls or struts about the gasket. These walls or struts serve to maintain the inner and outer sealing portions of the gasket in operative relation and, when the two containers are assembled, these struts will be operative to press the opposed annular surfaces of the gasket into frictional, sealing engagement with them. However, when assembling or disassembling the containers, the struts are operative to contract the outer portion of the gasket to the extent that the upper container is easily mounted upon or dismounted from the lower container.

As another problem, I have found that certain types of rubber-like materials, natural rubber, for example, will take a permanent set after repeated use under the conditions of heat and pressure in a coffee maker and will do so to the extent that after a while the containers cannot be held together during the coffee making cycle. To remedy this situation, particularly where rubber-like materials are used which are subject to permanent set, my invention contemplates the provision of means to give permanent resiliency to the sealing portions of the gasket. In the preferred embodiment of my invention I have provided an endless metallic spring which is incorporated in a gasket of the character above described and which serves to resist the tendency of the material to take a permanent compressive set. This spring may be permanently affixed to the gasket as an insert in the molding operation, or it may be inserted afterward as a removable part, as hereinafter more fully described.

Accordingly, my invention contemplates broadly the provision of a gasket construction for a vacuum type coffee maker which may be made of rubber-like material having the optimum surface hardness, yet which is readily compressible radially for ease of assembly and disassembly but which will not take a permanent compressive set after repeated use in spite of the fact that the rubber-like material itself has a tendency to do so under the conditions of use.

Another object of my invention is the provision of a coffee maker gasket formed of a pair of concentric rings of rubber-like material adapted for providing inner and outer seals and joined by a number of circumferentially spaced spokes of the same material and in which the inner ring can be stretched tightly under considerable tension about one of the coffee making containers to provide an effective inner seal without introducing any substantial tension in the other ring or interfering in any way with the latter ring's ability to engage the other container in a frictional manner to provide an effective outer seal.

Other objects and advantages will appear from the following description and the accompanying drawing, in which—

Figure 1 is a side view of a coffee maker embodying one modification of the present invention;

Figure 2 is a fragmentary enlarged sectional view of Figure 1 showing the assembled, gasketed connection between the upper and lower containers;

Figure 3 is a partial sectional view of Figure 2, taken on the line 3—3;

Figure 4 is a sectional view of the upper container, similar to Figure 3, showing the gasket configuration in the non-assembled condition, that is, when the upper container is removed from the lower container.

Figure 5 is a sectional view similar to a portion of Figure 2 showing, in combination, two other modifications of the present invention;

Figure 6 is a sectional view taken on the line 6—6 of Figure 5;

Figure 7 is a sectional view taken along the line 7—7 of Figure 5;

Figure 8 is a side view, partly in section, showing an upper container equipped with a gasket according to a further modification of my invention;

Figure 9 is a section of the modification shown in Figure 8, with the upper and lower vessels assembled;

Figure 10 is a side view of the endless spring used in the latter modification; and Figure 11 is a top view, partly in section, showing one-half of the gasket used in this latter modification.

Referring to Figure 1, the coffee maker shown is one known as the vacuum type which operates by displacement of hot water from the coffee container or pot 21 through the tube 22 into an upper container or bowl 23 containing the coffee grind. In this case the coffee grind is held on a filter (not shown) well known in this art, the filter being seated against the surface 20. After the hot water is effective to leach out the grind, the coffee liquid is caused to return to the pot through the lowering of the temperature therein.

In its embodiment here shown for purposes of illustration, the pot 21 may be heated in any preferred manner, as by placing it over a hot plate, or it may have incorporated in it an automatic electric heating unit such as that disclosed in my Patent 2,312,555, issued on March 2, 1943. The particular means chosen for heating will be immaterial inasmuch as it forms no part of the present invention which is confined to the improved gasket for sealing the bowl-pot connection.

Referring now more particularly to the elements of construction making up the present invention, the upper part of pot 21 is formed with an outwardly flared rim 24 which may be a separate part spun or soldered onto the throat 26 of the pot 21 as shown, or it may be formed as an integral part of the pot if desired. A handle 27 will be provided for the pot. The bowl 23 will have a similar handle 28 and a cup-shaped depending portion 29 of somewhat less diameter than the throat 26. The center of the cup-shaped portion will be strengthened by upper and lower annular plates 31 to which is attached the depending hollow bushing 32. The displacement tube 22 is connected to the bowl by threaded engagement with the bushing 32 which permits it to be removed for cleaning.

A gasket member, generally designated 33, will be interposed between the bowl and the pot in the operative or coffee making position shown in Figure 2. As will be seen, the gasket may be made of any rubber-like material, for example, natural rubber, or any of the synthetic rubber-like materials such as "neoprene," "Koroseal," chlorinated rubber, or the like. It comprises the following parts preferably formed integral with one another—(a) an inner ring portion 34 stretched taut over the depending peripheral surface 36 of the bowl, (b) an outer ring portion 37 adapted to be pressed into fluid sealing frictional engagement with the pot rim 24 and throat 26, (c) a series of connecting walls or struts 38 connecting the inner and outer rings and circumferentially spaced by means of the cavities 39, and (d) an imperforate annular wall 41 connecting the inner and outer rings at the bottom and sealing off the pot during the coffee making operation. It will be observed that the vertical height of the struts 38 is substantially greater than their length, whereby a substantial portion of the rim 24 and the throat 26 are gripped by the gasket above and below the point of greatest constriction indicated by the numeral 42.

In use, the gasket 33 will be attached to the bowl 23 and removable from the pot 21 with it. To this end both the gasket inner and outer rings 34 and 37 are interlockably engaged with the bowl. In the case of the inner ring the gasket bead 43 is engaged within the groove 44 formed in the periphery of the cup-shaped extension 29. To maintain the inner ring member 36 in this position against forces that might tend to stretch it off during removal of the bowl from the pot, it will be formed originally somewhat under size with respect to the cup 29 so that it can be stretched tightly over it. Thus the inner ring member has a definite sealing function in its engagement with the outer wall of the upper vessel. In the case of the outer ring member 37, the inwardly extending bead 46 will be engaged within the groove 47 formed at the top of the cup 29. This, however, is secondary to the main function of the outer ring member which is to provide for resilient sealing engagement with the throat wall of the rim 24.

The operation of the modification shown in Figures 1, 2, 3 and 4 will now be considered. Before the bowl is mounted on the pot, a cross-section taken through the uncompressed gasket and bowl along the line 3—3 in Figure 2 will be as shown in Figure 4 where the gasket is not compressed and the struts or spokes 38 extend in a radial direction. To assemble the maker for the brewing of coffee, the housewife will hold the containers by the handles 27 and 28 and press the bowl 23 downward upon the pot 21 rotating one slightly with respect to the other. In the usual case, I have found that she will rotate the bowl 23 clockwise while holding the pot 21 stationary, and under this condition the inner gasket ring 34 will be rotated clockwise slightly ahead of the outer gasket ring 37, which will be held back by frictional engagement with the pot. This will cause the struts 38 to assume a diagonal rather than radial configuration, as shown in Figure 3, and contract the outer gasket ring sufficiently that it can be pressed easily into the assembled position shown in Figure 2. Comparing the gasket radius A and B (Figures 4 and 3, respectively) in the non-assembled and assembled conditions, it will be seen that the radius B is less than A. After the coffee has been made the bowl 23 will be removed by lifting it and applying a twisting action to the handles. This will again apply a tensile stress to the struts 38 to contract the outer gasket ring 37 to relieve the pressure of the gasket upon the pot so that the bowl may be readily removed.

Figures 5, 6, and 7 illustrate in combination two modifications of my invention. In one of these modifications the structure 38 and cavities 39 are originally formed with a diagonal configuration (Figure 7) as compared with the radial struts and cavities previously described in connection with the modification shown in Figure 4. This makes the struts longer and more flexible and gives the gasket improved compressibility, thereby imparting to it an enhanced softness which is highly desirable for certain types of coffee makers, particularly where the gasket is of large diameter and would otherwise be objectionably difficult to press into the pot throat. The other modification illustrated in the last three figures involves the provision of a resilient wire spring 48 which in this instance is formed of a serpentine shape and molded integral with the gasket. This spring may be of other shape suitable for this purpose and, where preferred, it may be inserted as a separate part (as described with reference to Figures 7 to 11) instead of being molded integral with the gasket. At any rate, the spring will preferably be positioned closely behind the outer gasket portion 37 where it will serve to provide permanent resiliency and to prevent the outer portion from functioning with a permanent compressive set after repeated use. Certain types of rubber-like materials (for example some grades of natural rubber) are highly desirable for use in coffee maker gasket service from the standpoint that they are odorless and tasteless, but their use has previously been avoided for this service due to the fact that they will sooner or later take a permanent compressive set and become unfit for use. However, with a gasket formed to incorporate a spring member, such as shown in the last three figures, this tendency to take a permanent set will be entirely eliminated and the gasket will be useable over many thousands of coffee making cycles. Thus, with the modifications of my invention described it will be obvious that it is applicable to coffee makers employing a variety of gasket diameters and the gaskets may be made of any of a wide variety of rubber-like materials whether the material itself has a tendency to take a permanent set or not.

In Figures 8 to 11, I have shown a modification of my invention which I believe has particular merit because of its highly efficient sealing effects, together with low cost of manufacture. The body of rubber-like material is simplified to provide essentially an inner annular portion 51 shaped for sealing engagement on its inner side with the depending portion 29 of the bowl 23, an outer annular portion 52 shaped for sealing engagement at its outer side in the throat of the pot 21, and connecting walls 53 which are arranged to provide circumferentially spaced cavities, as above described. In this embodiment the body may also have an imperforate lower wall 54 to seal off the cavities. In this form the side wall shape of the depending portion 29 has been simplified to eliminate the groove 47 described in connection with the first embodiment. Also, in the present embodiment the cavities are of relatively larger volume and there are correspondingly fewer connecting walls 53. These connecting walls and cavities are so shaped and arranged as to give increased flexibility to the outer wall portion 52 and to permit assembling and disassembling of the upper and lower containers without the need for imparting a twisting or circumferential movement. In other words, the upper container may be inserted and removed by a simple one-way movement as distinguished from a twisting movement. Also, high radial wall pressure is obtained by the application of permanent resilient means such as an endless serpentine spring member 55 which coacts with the outer wall portion 52 and in this respect functions similar to the spring member 48 above described. However, in this embodiment it will be observed that the spring member 55 is not set into the resilient gasket body in the molding thereof, but rather it is inserted after the body has been molded. In furtherance of this objection, both the spring member and the cavities have been formed so that the spring convolutions match with the cavities and connecting walls, thus permitting the spring member to be inserted into position through the open ends of the cavities. This assembly eliminates certain problems and difficulties in connection with molding the gasket body together with a spring insert, and also serves to reduce the cost of manufacture. This spring member 55 is also removable and replaceable with respect to the resilient gasket body. In this embodiment the spring member provides permanent resiliency which overcomes any tendency of the outer gasket portion to take a set after the gasket has been in use for a period of time.

In all embodiments, my invention provides a resilient gasket having the following characteristics and advantages:

(1) It will readily conform to any normal irregularities in size and shape of the throat in the lower container or pot;

(2) By reason of its cavity structure, the gasket may be composed of rubber-like material which has the optimum surface hardness for giving it good wearing qualities and to avoid sticking when assembling and disassembling;

(3) By reason of its internal structure, the gasket provides a high degree of radial compression which is utilized in effecting a good sealing action;

(4) It eliminates the necessity of extraneous clamping means between the upper and lower containers;

(5) By the provision of means such as the serpentine spring, permanent resiliency is provided which overcomes any lowering of the radial compression due to tendency of the rubber-like material to take a permanent set under the extreme conditions of use;

(6) It promotes economy in the over-all cost of manufacture of vacuum type coffee makers.

My invention, therefore, provides a gasket structure which will satisfactorily perform the desired functions over a long period of time.

While I have shown several embodiments of my invention, it will be understood that I do not wish to be limited thereto since my modifications may be made, and I therefore contemplate by the appended claims to cover any such modifications as fall within the true spirit and scope of my invention.

I claim:

1. A gasket adapted for use with a coffee maker upper vessel having a depending annular lower portion adapted to be located in the throat of a lower vessel when in operative position, comprising an annular gasket body of rubber-like material having an inner wall portion seated on the periphery of said lower portion and an outer wall portion adapted to be seated in the throat of the lower vessel, said body having a series of circumferentially spaced cavities alternating with a series of resilient walls connecting said inner and outer wall portions and resilient means inserted into the cavities of said gasket and normally stressed to yieldingly engage and resist radial compression of the outer wall portion, each cavity being of greater radial dimension than the thickness of the resilient means in a direction radial of the gasket, whereby the resilient means is capable of flexing in said radial direction within the cavities and with respect to the gasket body when said outer wall is displaced radially under compression incident to inserting the gasket in the throat of the lower vessel.

2. A gasket adapted for use with a coffee maker upper vessel having an annular portion depending from its bottom wall adapted to be located in the throat of a lower vessel when in operative position, comprising an annular gasket of rubber-like material seated on the periphery of said annular lower portion, said gasket comprising spaced inner and outer annular portions connected by circumferentially spaced walls, said annular portions being connected at the bottom thereof by an imperforate wall and being open between the top portions; the inner of said annular gasket portions being seated in fluid sealing engagement with the said lower portion and the outer of said annular portions being seated in fluid sealing engagement upon said lower vessel throat and also in sealing engagement with the underside of said bottom wall of the upper vessel, the opening between said annular portions at the top thereof being closed by said sealing engagements of the gasket with the upper vessel.

3. A gasket comprising a body of resilient material having an inner ring portion adapted for a sealing function at its inner side, an outer ring portion adapted for a sealing function at its outer side, said ring portions being in spaced relation and connected together by a series of strut portions which with the ring portions provide a series of cavities, and a continuous spring member of serpentine form providing elongated spring elements inserted into the cavities and coacting with said outer ring portion to provide a resilient sealing function.

4. A gasket comprising a body of resilient material having an inner annular portion adapted for a sealing function at its inner side, an outer annular portion adapted for a sealing function at its outer side, said ring portions being in spaced relation and connected together by an imperforate wall portion and a series of strut portions which with the ring portions provide a series of cavities, said cavities being open at one end of the body, and an endless serpentine spring member inserted into the cavities through said open side thereof and coacting with said outer annular portion to supplement the sealing action of said outer ring portion.

5. A gasket adapted for use in a coffee maker upper vessel having a depending annular lower portion adapted to be located in the throat of a lower vessel when in operative position, comprising an annular gasket of rubber-like material having an inner wall portion seated on the periphery of said lower portion and an outer wall portion adapted to be seated in the throat of the lower vessel, a series of circumferentially spaced cavities in said gasket alternating with a series of resilient walls connecting said inner and outer wall portions, and an endless spring member having spring elements inserted into said cavities and arranged to yieldingly resist radial compression of the outer wall portion.

6. A gasket as set forth in claim 2 wherein an annular spring member is inserted in the space between the inner and outer portions through the open top thereof and is tensioned to yieldingly resist radial compression of the outer annular portion when inserting the gasket in the throat of the lower vessel.

IVAR JEPSON.

REFERENCES CITED

The following references are of record in the file of this patent:

UNITED STATES PATENTS

| Number | Name | Date |
|---|---|---|
| 761,702 | Paradis | June 7, 1904 |
| 872,169 | Clayton | Nov. 26, 1907 |
| 1,038,642 | Perry | Sept. 17, 1912 |
| 1,490,716 | Schwennker | Apr. 15, 1924 |
| 1,802,177 | Knight | Apr. 21, 1931 |
| 2,223,450 | Jepson et al. | Dec. 3, 1940 |
| 2,265,615 | Stalter | Dec. 9, 1941 |
| 2,314,543 | Kopf | Mar. 23, 1943 |
| 2,321,411 | Morse | June 8, 1943 |
| 2,381,104 | Burnham | Aug. 7, 1945 |